United States Patent
Biggadike

(10) Patent No.: US 8,927,868 B2
(45) Date of Patent: Jan. 6, 2015

(54) ROUTING OF CABLES

(75) Inventor: Christopher Biggadike, Cheltenham (GB)

(73) Assignee: Ultra Electronics Limited, Greenford, Middlesex (GB)

( * ) Notice: Subject to any disclaimer, the term of this patent is extended or adjusted under 35 U.S.C. 154(b) by 957 days.

(21) Appl. No.: 12/989,337

(22) PCT Filed: Apr. 24, 2009

(86) PCT No.: PCT/GB2009/001049
§ 371 (c)(1),
(2), (4) Date: Jan. 5, 2011

(87) PCT Pub. No.: WO2009/130743
PCT Pub. Date: Oct. 29, 2009

(65) Prior Publication Data
US 2011/0100679 A1    May 5, 2011

(30) Foreign Application Priority Data
Apr. 25, 2008  (GB) .................................. 0807626.7

(51) Int. Cl.
| H01B 7/00 | (2006.01) |
| H01B 7/24 | (2006.01) |
| B64C 9/02 | (2006.01) |
| H02G 11/00 | (2006.01) |
| E05D 11/00 | (2006.01) |

(52) U.S. Cl.
CPC ............ *H02G 11/00* (2013.01); *E05D 11/0081* (2013.01)
USPC ........................... 174/135; 244/99.2; 244/214

(58) Field of Classification Search
USPC .................................. 174/135; 244/99.2, 214
See application file for complete search history.

(56) References Cited

U.S. PATENT DOCUMENTS

| 3,823,249 | A |   | 7/1974  | Floessel et al. |
| 4,168,821 | A | * | 9/1979  | Engemann ..................... 254/389 |
| 4,273,546 | A | * | 6/1981  | Bergles ............................ 474/82 |
| 4,545,555 | A | * | 10/1985 | Koch ......................... 248/280.11 |
| 4,770,384 | A | * | 9/1988  | Kuwazima et al. ...... 248/281.11 |
| 5,141,446 | A |   | 8/1992  | Ozouf et al. |
| 5,164,546 | A | * | 11/1992 | Kumagai ...................... 174/135 |
| 5,358,352 | A | * | 10/1994 | Klarhorst ...................... 403/104 |

(Continued)

FOREIGN PATENT DOCUMENTS

| DE | G 94 19 315.0 | 4/1995 |
| DE | 93 21 260 U1  | 6/1997 |

(Continued)

OTHER PUBLICATIONS

Japanese Office Action for JP 2011-505587, dated Aug. 20, 2013.

*Primary Examiner* — Jeremy C Norris
*Assistant Examiner* — Nathan Milakovich
(74) *Attorney, Agent, or Firm* — Merchant & Gould P.C.

(57) ABSTRACT

A cable (7) is routed between a pair of links (1, 2) that are pivotally connected about a lateral pivot axis (4). A wound section (8) is provided in the cable with the winding axis coincident with the pivot axis of the links. The wound section (8) may be preformed. A cable protector (10, 11) is provided each end of the wound section (8) along the pivot axis (4) so as to constrain the adjacent end of the wound section (8) to be keyed with it and the adjacent link.

7 Claims, 5 Drawing Sheets

(56) References Cited

U.S. PATENT DOCUMENTS

| | | | |
|---|---|---|---|
| 5,367,827 A * | 11/1994 | Tajima et al. | 49/352 |
| 5,416,273 A | 5/1995 | Maciejewski | |
| 5,799,079 A | 8/1998 | Inoue | |
| 5,995,373 A * | 11/1999 | Nagai | 361/755 |
| 6,378,829 B1 * | 4/2002 | Strater et al. | 248/276.1 |
| 6,743,976 B2 * | 6/2004 | Motzigkeit | 174/486 |
| 6,809,264 B2 * | 10/2004 | Watanabe et al. | 174/72 A |
| 6,818,827 B2 * | 11/2004 | Kato et al. | 174/72 A |
| 7,075,011 B1 * | 7/2006 | Kogure et al. | 174/72 A |
| 7,249,735 B2 * | 7/2007 | Amorosi et al. | 244/99.2 |
| 7,265,295 B2 * | 9/2007 | Kogure et al. | 174/72 A |
| 7,294,784 B2 * | 11/2007 | Watanabe et al. | 174/72 A |
| 7,297,871 B2 * | 11/2007 | Watanabe et al. | 174/72 A |
| 7,306,481 B2 * | 12/2007 | Tsukamoto | 439/501 |
| 7,439,446 B2 * | 10/2008 | Blase et al. | 174/95 |
| 8,360,364 B2 * | 1/2013 | Guering et al. | 244/118.5 |
| 2003/0213101 A1 | 11/2003 | Lin | |
| 2005/0230148 A1 | 10/2005 | Sinnett et al. | |
| 2006/0038088 A1 * | 2/2006 | Dodson | 244/214 |
| 2007/0034747 A1 | 2/2007 | Amorosi et al. | |
| 2011/0061895 A1 * | 3/2011 | Terada et al. | 174/135 |
| 2011/0061982 A1 * | 3/2011 | Cheng et al. | 191/12.2 R |

FOREIGN PATENT DOCUMENTS

| | | |
|---|---|---|
| DE | 199 22 153 | 11/2000 |
| DE | 10 2004 059 009 | 6/2006 |
| GB | 1 437 956 | 6/1976 |
| JP | 57-21218 | 2/1982 |
| JP | 02-097830 | 8/1990 |
| JP | 2000-316229 | 11/2000 |

\* cited by examiner

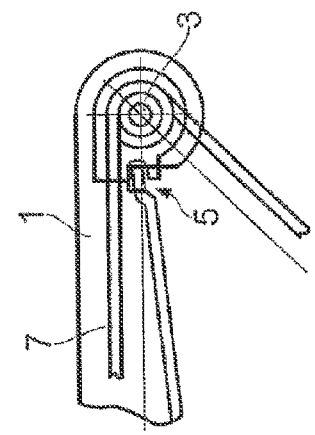
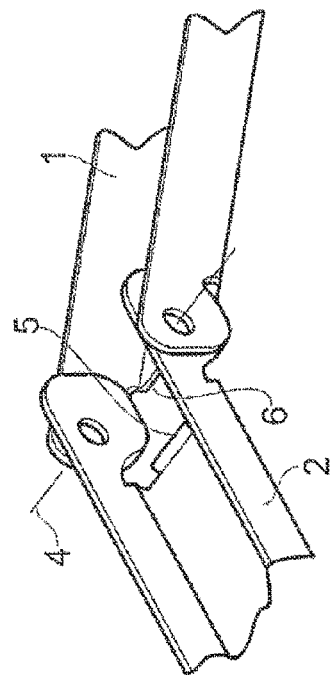
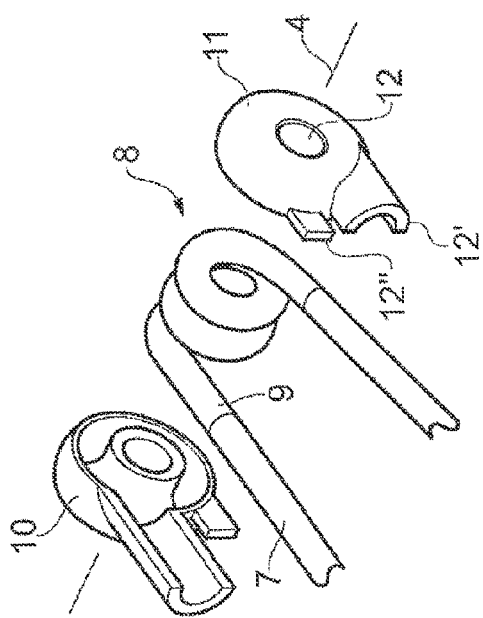
FIG. 1
FIG. 2
FIG. 3

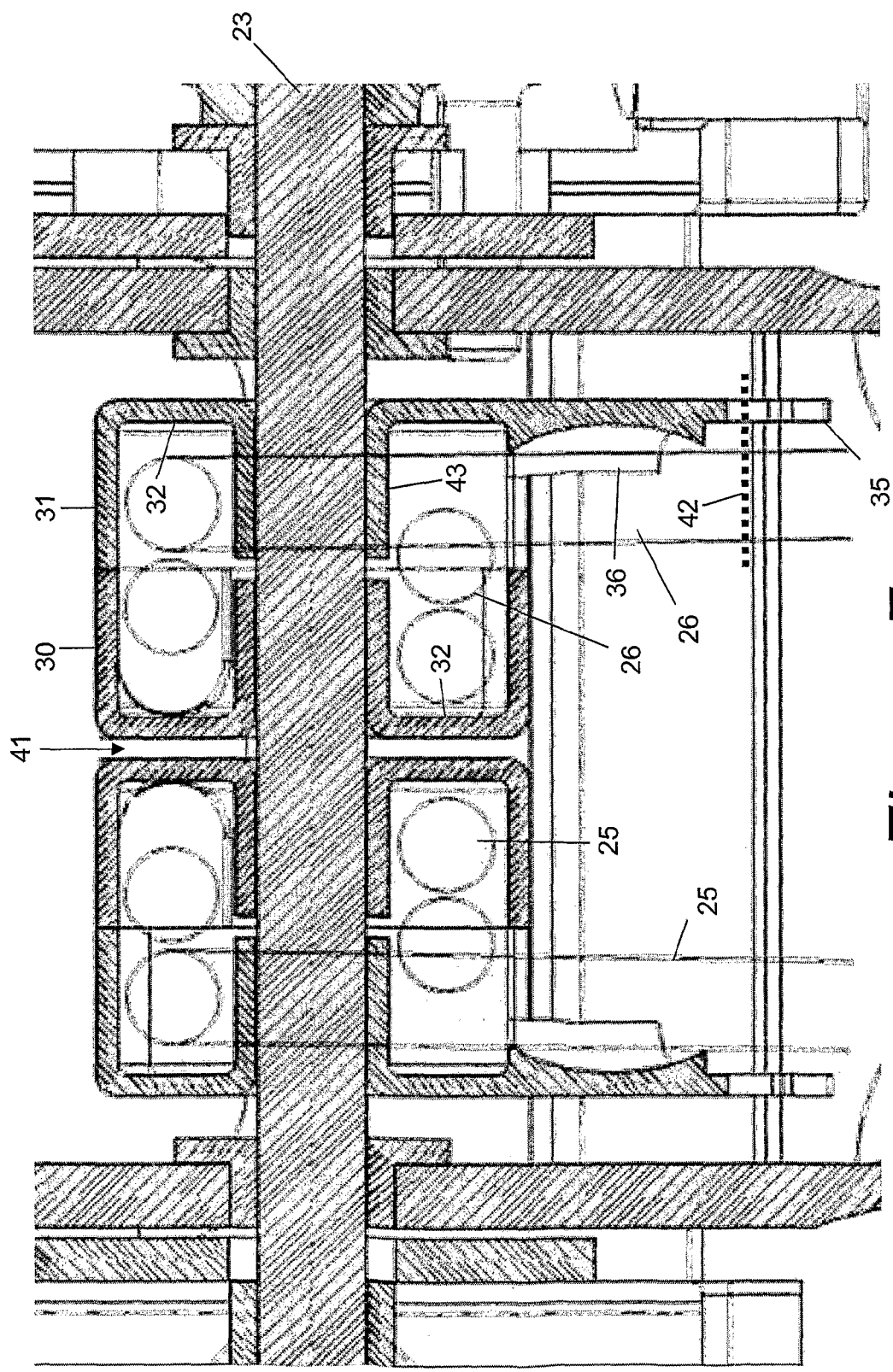

ROUTING OF CABLES

This application is a National Stage application of PCT/GB2009/001049, filed on 24 Apr. 2009, which claims benefit of Ser. No. 0807626.7. filed 25 Apr. 2008 in Great Britain and which applications are incorporated herein by reference. To the extent appropriate, a claim of priority is made to each of the above disclosed applications.

FIELD OF THE INVENTION

This invention relates to routing of cables, and especially a method and means for routing a cable between components that move relative to one another repeatedly when in operation and therefore pose a fatigue problem for the cable. The invention also relates to a cable protector suitable for protecting such cables.

BACKGROUND OF THE INVENTION

In aerospace applications it is often necessary to run electrical cables between components such as a wing structure and a flap that move relative to one another and cause the cable to flex. It is therefore necessary to design the cable run to protect against unacceptable damage over the lifetime of the cable.

US2007/0034747 describes a pair of mechanical links pivotally connected to pivot relative to one another about a lateral pivot axis and a cable that extends along both links and is adapted to accommodate pivotal movement between the links, the cable having a wound section with a winding axis coincident with the pivot axis. A problem with the arrangement described in US2007/0034747 is that the links may be relatively heavy, as well as being complex to manufacture and assemble.

SUMMARY OF THE INVENTION

According to a first aspect of the invention, there is provided a pair of mechanical links pivotally connected to pivot relative to one another about a lateral pivot axis and a cable that extends along both links and is adapted to accommodate pivotal movement between the links, the cable having a wound section with a winding axis coincident with the pivot axis, in which a cable protector is provided each end of the wound section along the pivot axis so as to constrain the adjacent end of the wound section and to be keyed with it, and to be keyed with the adjacent link.

According to a second aspect of the invention, there is provided a method of routing a cable between a pair of links that are pivotally connected about a lateral pivot axis comprising providing a wound section in the cable with the winding axis coincident with the pivot axis of the links, in which a cable protector is provided each end of the wound section along the pivot axis so as to constrain the adjacent end of the wound section and to be keyed with it, and to be keyed with the adjacent link.

Forming the links and the cable protectors as separate pieces enables the links to be relatively simple to manufacture and assemble. Also it enables the cable protectors to be formed from a low friction material and/or a low density material, relative to the material forming the links. In operation, when the links pivot relative to one another, the cable will flex and angular movement of those portions either side of the wound section will be translated into a slight winding or unwinding of the wound coil, thereby reducing stress on the cable. Keying the cable protector to both the adjacent link and the adjacent end of the wound section ensures that the cable protectors rotate relative to one another as the links pivot relative to one another. This minimizes the relative movement between the cable protector and the adjacent end of the wound section as it winds or unwinds, and thus reduces the possibility of fretting caused by the cable protector rubbing against the cable.

Each cable protector may constrain the adjacent end of the wound section by engaging it at all times, or it may only engage the adjacent end of the wound section under certain operating conditions. For instance it may engage the adjacent end of the wound section only when the links are fully open and the wound section is fully coiled, or only in an operating condition in which the wound section has drifted along the pivot axis due to vibration of the links.

Each cable protector may be keyed with the adjacent end of the wound section by a tangential channel with at least a base and a pair of side walls which receives the adjacent end of the wound section, and each cable protector may be keyed with the respective one of the links by a tag or other projection extending from an outer edge of the cable protector which engages the respective link. In addition each cable protector may be firmly attached to the adjacent end of the wound section by a cable tie.

The cable protectors may be flat disks with inner faces which engage only the axially outer ends of the wound section. However more preferably each cable protector has an inner face which is dished to accommodate the adjacent end of the wound section. This dished shape enables the cable protector to protect the radially outer sides of the adjacent end of the wound section as well as its axial ends.

Typically the cable protectors either engage each other or are separated by a gap which is narrower than the width of the cable, thus fully constraining the wound section of cable between them.

Preferably each cable protector is substantially formed from a material with a lower coefficient of friction than the material forming the links.

The wound section may be preformed and/or may be supported in their wound state in operation.

A second cable may be provided, that extends along both links and is adapted to accommodate pivotal movement between the links, the second cable having a wound section with a winding axis coincident with the pivot axis. A cable protector may be provided each end of the wound section of the second cable along the pivot axis so as to constrain the adjacent end of the wound section of the second cable and to be keyed with it, and to be keyed with the adjacent link.

A third aspect of the invention provides a cable protector comprising a disc shaped member with a central aperture, an inner face of the cable protector being dished to accommodate the adjacent end of a wound section of cable when in use; an arm extending tangentially from an outer edge of the disc shaped member, the arm comprising a base and a pair of side walls which together define a channel which is adapted to receive and key with a length of cable extending from the wound section of cable when in use; and a tag extending from an outer edge of the disc shaped member.

BRIEF DESCRIPTION OF THE DRAWINGS

The invention will now be described by way of example with reference to the accompanying drawings in which:

FIG. 1 shows a pivotal connection between two links;

FIG. 2 shows the side elevation of the links of FIG. 1 including a cable according to the invention;

FIG. 3 shows the wound section of the cable of FIG. 2, together with cable protectors either side;

FIG. 7 is a sectional view through the joint between the links shown in FIG. 4, parallel with the pivot axis.

DETAILED DESCRIPTION OF EMBODIMENT(S)

Figure 4:
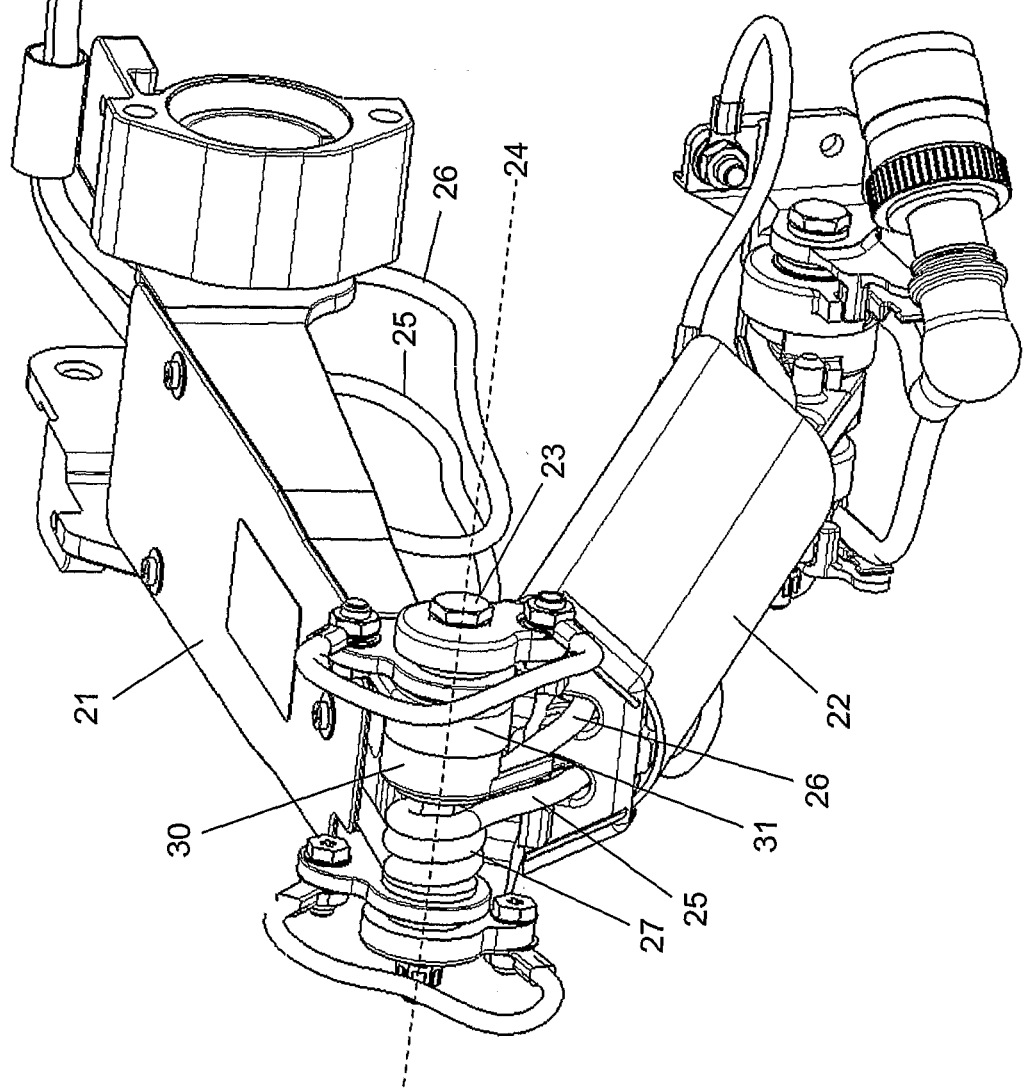
FIG. 4 is an isometric view showing an alternative embodiment of the invention.

FIGS. 1 and 2 show a pair of links 1, 2 such as might be provided between the wing structure and the flap of an aircraft. The links are pivotally connected by a pivot pin 3 so as to rotate about a lateral pivot axis 4. The outer ends of the links 1 and 2 are not shown, but it will be appreciated that in the above example, the outer end of one link is connected to the wing structure and the outer end of the other link is connected to the flap. The pivotal movement of the links 1, 2 relative to one another is limited in the closing direction by tabs 5, 6 on each which cooperate when the maximum closed position is reached. An electrical cable 7 runs the length of the links 1, 2 between the wing structure and the flap and may service electrical signals or a power supply forming part of a warning system, for example, a system monitoring leading edge failures.

As shown in FIGS. 2 and 3, the cable in the region of the pivot 3 is wound into a helical coil 8 that is adapted to surround the pivot pin 3 so that the coil axis is coincident with the pivot axis 4. The wound section 8 of the cable is preferably preformed in the wound shape, and this may be achieved by providing an additional PTFE jacket 9 on this section of the cable.

A cable protector 10, 11 is provided each end of the wound section 8 of the cable, and takes the form of a disc shaped member with a central aperture 12 to accommodate the pin 3. The inner face of each cable protector 10, 11 is dished to accommodate the adjacent end of the wound section and has a tangential channel 12' to receive the length of cable extending from the coil, so that the protector is keyed angularly to the cable. A tag 12" extending from the outer edge of the cable protector engages the link along which the adjacent cable extends and thereby keys the protector angularly to the link. Therefore, in operation, as the links 1, 2 pivot relative to one another, the respective lengths of the cable either end, of the wound section 8 and the cable protectors 10, 11 keyed to them, rotate relative to one another. As a result, the wound section is either wound slightly as the links pivot together, or is unwound slightly, as the links pivot apart.

It will be appreciated that the outer portions of the links 1, 2 may also incorporate pivotal links between them and the structures to which they are connected, and the cable may incorporate further wound sections like section 8 which are arranged with the coil axis coincident with the pivotal axis of the connection so as to accommodate pivoting movement without unduly stressing the cable.

The embodiment of the invention illustrated in FIG. 4 comprises a pair of links 21, 22 such as might be provided between the wing structure and the flap of an aircraft. The links are pivotally connected by a pivot pin 23 so as to rotate about a lateral pivot axis 24. The outer end of one link is connected to the wing structure and the outer end of the other link is connected to the flap. A pair of electrical cables 25, 26 run the length of the links 21, 22 between the wing structure and the flap and may service electrical signals or a power supply forming part of a warning system, for example, a system monitoring leading edge failures.

Each cable in the region of the pivot pin 23 is wound into a helical coil that is adapted to surround the pivot pin 23 so that the coil axis is coincident with the pivot axis 24. A coiled section 27 is shown for cable 25, but the coil for cable 26 is hidden by a pair of cable protectors 30, 31 which will be described in more detail below. The wound section 27 of the cable is preferably preformed in the wound shape, and this may be achieved by providing an additional PTFE jacket on this section of the cable.

A cable protector is provided each end of the wound section of each cable 25, 26. Cable protectors 30, 31 house the wound section of cable 26, and identical cable protectors (shown in FIG. 7 but omitted from FIG. 4) house the wound section 27 of cable 25. In common with the cable protectors 10, 11 in the embodiment of FIG. 1-3, the cable protectors 30, 31 engage and are keyed with the adjacent end of the wound section of cable, and are keyed with the adjacent link.

Figure 5:
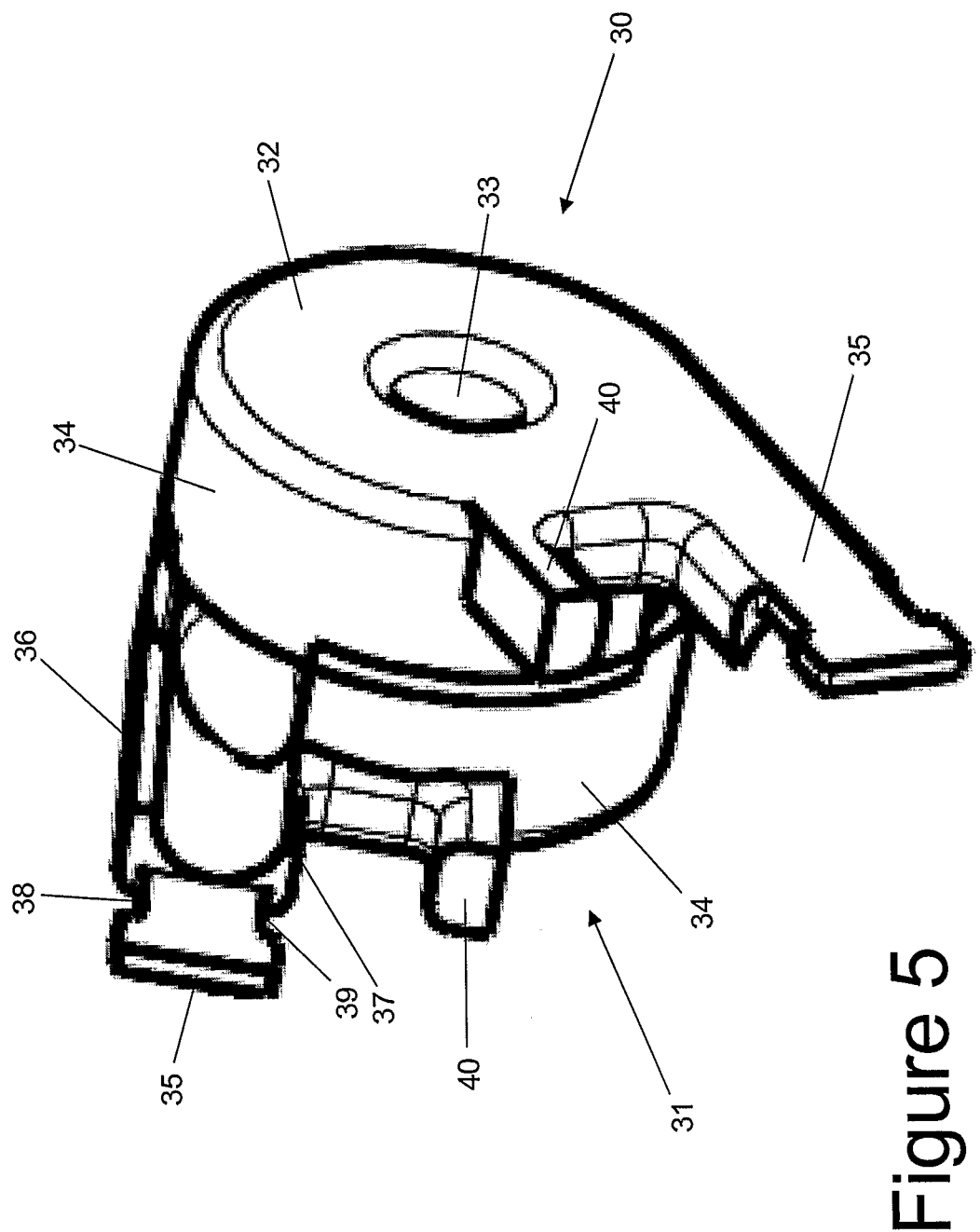
FIG. 5 shows a pair of cable protectors.
Figure 6:
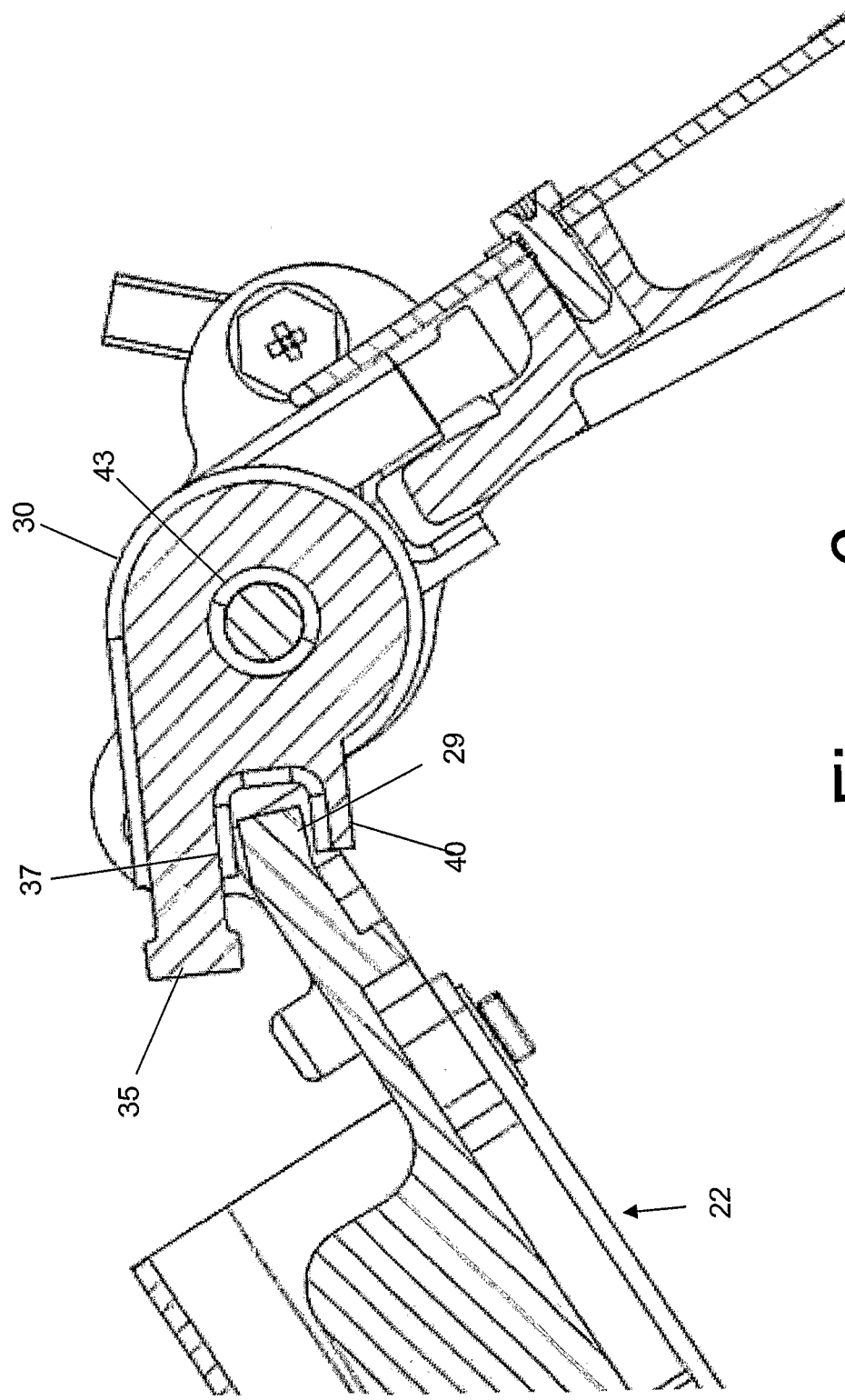
FIG. 6 is a sectional view through the joint between the links shown in FIG. 4, transverse to the pivot axis.

The cable protectors 30, 31 are shown in detail in FIG. 5. Each takes the form of a disc shaped member including an end plate 32 with a central aperture 33 to accommodate the pin 23. The aperture 33 passes through a hub 43 extending from the inner face of the end plate 32 shown in FIGS. 6 and 7. An annular side wall 34 extends inwardly from the end plate and gives the cable protector a dished shape to accommodate the adjacent end of the wound section. An arm 35 extends tangentially from the end plate 32 and carries a pair of side walls 36, 37. The arm 35 and side walls 36, 37 together define the base and side walls of a channel which receives the length of cable extending from the coil so that the protector is keyed angularly to the cable 26. Note that the channel has a length greater than its width so that the cable 26 is securely keyed with the arm 35. The distal end of the arm 35 has a pair of notches 38, 39 which receive a cable tie (not shown) to securely attach the cable to the arm 35.

A tag 40 extending from the outer edge of the cable protector engages the link along which the adjacent cable extends and thereby keys the protector angularly to the link. This engagement is shown in more detail in FIG. 6 which is a sectional view in which the cables 25, 26 are omitted. The arm 22 has a projecting part 29 which is received in the gap between the tab 40 and the arm 35, thus keying the arm 22 to the cable protector 30. Therefore, in operation, as the links 21, 22 pivot relative to one another, the respective lengths of the cable either end of the wound section 28 and the cable protectors 30, 31 keyed to them, rotate relative to one another. As a result, the wound section is either wound slightly as the links pivot together, or is unwound slightly, as the links pivot apart. The rotation of the cable protector minimizes the relative movement between the cable protector and the adjacent end of the wound section as it winds or unwinds, and thus reduces the possibility of fretting caused by the cable protector rubbing against the cable.

FIG. 7 is a sectional view showing the wound section of cable, pivot pin 23, and cable protectors 30, 31. The cable 26 is keyed to the arm 35 by the pair of side walls 36, 37, one of which is shown in FIG. 7. The cable 26 is also securely attached to the arm 35 by a cable tie indicated schematically by a dotted line 42.

Each cable protector is formed from a bearing material such as Polyoxymethylene (sold under the trade name Delrin (R)) or Nylon. Such materials have a lower density and coefficient of friction than the structural material (such as aluminium) forming the links.

The cable protectors 30, 31 engage each other, and are separated from the other pair of cable protectors by a small gap 41. The low friction material enables the edges of the walls 34 of the cable protectors to slide against each other, the cable to slide against the end plate 32 and the inner side of the wall 34, and the hub 43 to slide against the pivot pin 23 with a relatively low coefficient of friction.

Small gaps are shown in FIG. 7 between the inner faces of the end plates 32 of the cable protectors and the adjacent ends of the wound section of cable 26. However these gaps are sufficiently small that the cable may be engaged (and hence constrained) by the end plates 32 under certain operating conditions—for instance when the links are fully open and the wound section is fully coiled and/or when the wound section has drifted along the pivot axis due to vibration of the links.

Although the invention has been described above with reference to one or more preferred embodiments, it will be appreciated that various changes or modifications may be made without departing from the scope of the invention as defined in the appended claims.

The invention claimed is:

1. A pair of links that are pivotally connected about a lateral pivot axis and a cable that extends along both links, the cable having a wound section with a winding axis coincident with the lateral pivot axis; wherein a cable protector is provided at each end of the wound section along the lateral pivot axis so as to constrain an adjacent end of the wound section and to be keyed with the wound section, and to be keyed with an adjacent one of the pair of links; each cable protector comprising a disc shaped member with a central aperture, an inner face of the cable protector being dished to accommodate the adjacent end of the wound section of cable; an arm extending tangentially from an outer edge of the disc shaped member, the arm comprising a base and a pair of side walls which together define a channel to receive and key with a length of cable extending from the wound section of cable; and a tag extending from the outer edge of the disc shaped member.

2. A pair of links as claimed in claim 1, wherein each channel has a length greater than its width.

3. A pair of links as claimed in claim 1, wherein each cable protector is keyed with a respective one of the pair of links by the tag which engages the respective one of the pair of links.

4. A pair of links as claimed in claim 1, wherein the cable protectors either engage each other or are separated by a gap which is narrower than a width of the cable.

5. A pair of links as claimed in claim 4, wherein the cable protectors engage each other.

6. A pair of links as claimed in claim 1, wherein each cable protector is substantially formed from a material with a lower coefficient of friction than the material forming the links.

7. A pair of links as claimed in claim 1, wherein the links and cable protectors are formed as separate pieces.

* * * * *